Nov. 29, 1960 L. L. JOHNSON 2,962,644
GENERATOR - MOTOR POWER TRAIN AND CONTROL
Filed Aug. 31, 1956
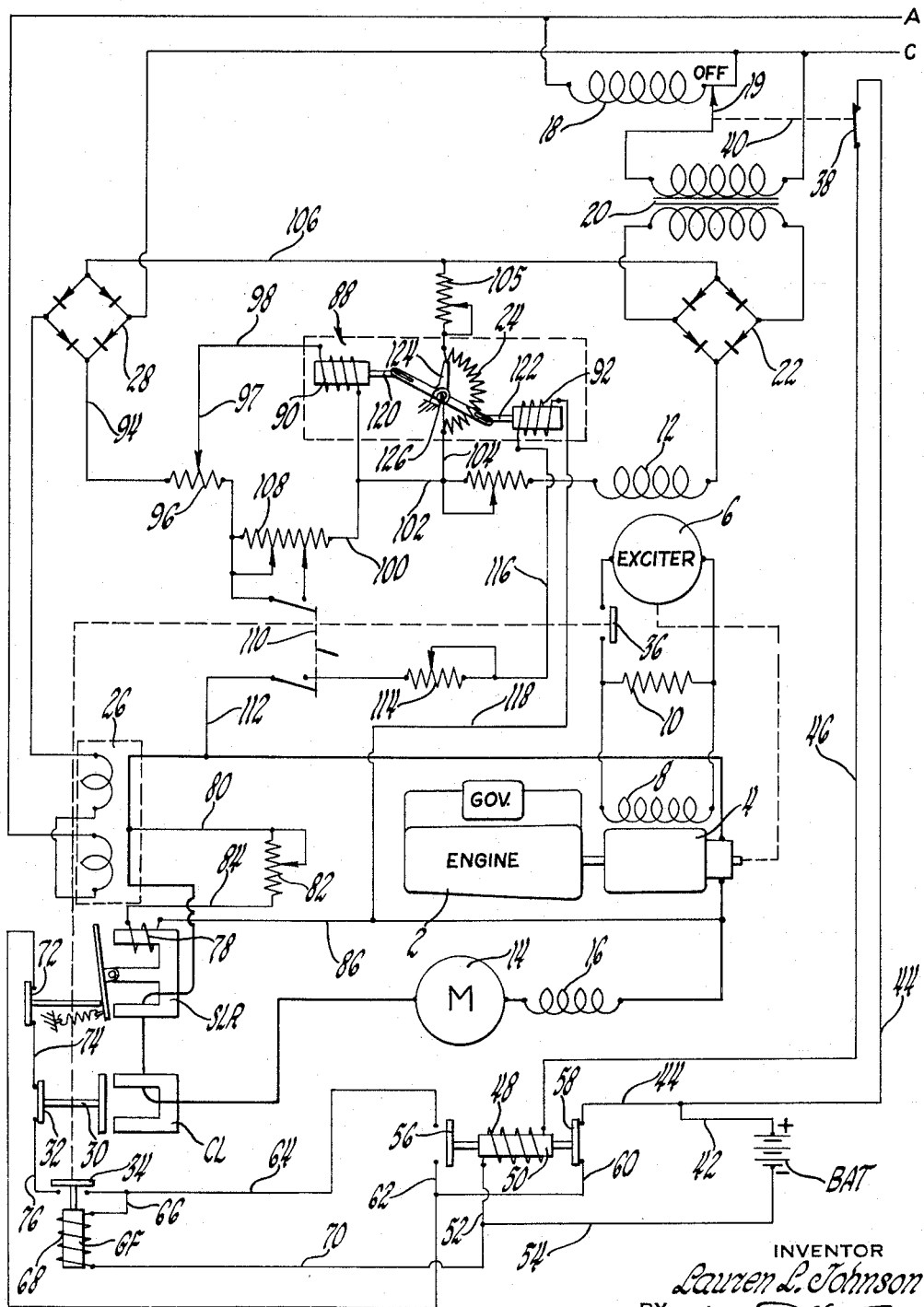
INVENTOR
*Lauren L. Johnson*
BY
*J. C. Thorpe*
ATTORNEY.

United States Patent Office 2,962,644
Patented Nov. 29, 1960

2,962,644

GENERATOR-MOTOR POWER TRAIN AND CONTROL

Lauren L. Johnson, Westchester, Ill., assignor to General Motors Corporation, Detroit, Mich., a corporation of Delaware Filed Aug. 31, 1956, Ser. No. 607,465

7 Claims. (Cl. 318—144)

This invention relates generally to prime mover-generator-motor power transmissions and controls therefor and is particularly concerned with the control of the transmission of power from the prime mover through the generator to one or more electrical motors adapted to drive a load clutched thereto whereby certain operating characteristics are obtained and protection of both the mechanical and the electrical portions of the equipment in the power train are protected against injury or damage which might otherwise be caused by excessive motor speed or torque or both.

The invention is particularly related to controls for power generating and transmitting equipment for use in the oil well drilling field. In order to fully understand and appreciate the significance of the present invention, the following preliminary explanation is offered which will serve to illustrate in a general way the more important power transmission and control problems encountered in such field for which the present invention has been provided.

As is well known by those engaged in the drilling of oil wells, there are three basic operations which require heavy power. One of these is the so-called drilling operation which utilizes a rotary drill table supporting and feeding pipe into the hole as the pipe is rotated thereby with the drilling bit fixed to the lower end of the pipe. It will be appreciated that this operation, while relatively simple and continuous for long periods of time, does require wide variations in power as the varying types of strata are encountered and as the hole gets deeper and requires greater amounts of drilling pipe. A second operation which is also considered basic is the powering of one or more mud pumps whose purpose is to pump "mud" down through the drilling pipe during the drilling operation and up the pipe on the outsides thereof to lubricate the pipe as it turns in the hole and also carry away the drillings. The amount and the characteristic of the power needed to perform the mud pumping operation, it will be readily appreciated, may vary considerably. A third basic operation is the "draw-works" operation which involves periodically drawing the pipe in predetermined lengths from the hole in order to change the drilling bit after which the pipe is again lowered into the hole to continue the drilling operation. Since these drilled holes sometimes reach depths of four miles and more, the wide variation in power and load characteristic becomes apparent.

From the foregoing it will be appreciated that the power requirements for these individual operations vary considerably and that it is essential that the speeds and torques (which must necessarily vary over extremely wide ranges) of the motors which supply the power to perform these operations be carefully controlled so as to prevent injury to both the electrical and mechanical portions of the drilling equipment.

It is, of course, essential that control of the power, speed and torque of the motors which perform various drilling operations be placed in the hands of the driller in order that he may control the performance of these drilling operations over a relatively wide range; and in fact it is an object of this invention to provide a power train and control for just such purpose. However, experience has taught that when wide ranges of power, torque and speed are placed in the hands of an operator, the use thereof is often inadvertently abused resulting in serious damage to both the mechanical and electrical equipment of the power train or loads coupled thereto. It is therefore a further object of this invention to provide safeguards inherent in the controls which prevent any such abuses.

The type of equipment chosen which most nearly matches the operational requirements of the various drilling operations also raises problems of equipment protection. To cite one simple example, it has been found that the series type of electrical motor has performance characteristics which are best able to handle the types of extreme variations in torques and speed required to perform the different drilling operations. It is well known, however, that large changes in load on such motors may cause relatively large speed changes which might cause inqury to such motors or the load connected thereto. It is therefore a further object of this invention to provide means for preventing damage which might otherwise be caused by the conditions of the type just mentioned which may occur because of the certain types of equipment selected and because of the occurrence of conditions over which the operator has no control.

For a fuller understanding of the invention and the objects thereof, reference may be had to the accompanying detailed description and drawing, in which the single figure represents a schematic diagram of the power train control therefor which is particularly adapted for various oil drilling operations.

Referring now to the drawings, the basic power train and control therefor will be described. The power train includes an engine 2 having a governor GOV which maintains the engine speed constant for any given engine throttle setting. Although any type of internal combustion engine can be used, in the present instance, it is preferred to employ a diesel engine whose maximum power is governed by the engine throttle setting and whose speed is maintained constant over a wide range of engine power up to the maximum power obtainable with the particular engine throttle setting. The engine 2 is coupled to drive a separately excited generator 4 and an exciter 6 at constant speed since the engine 2 is governed to maintain constant speed. The generator 4, as previously mentioned, is separately excited and by a winding 8 which is adapted to be connected in parallel with a resistor 10 across the terminals of the armature of the exciter 6. The exciter 6 is also separately excited by a winding 12 which is energized in a manner to be described in greater detail shortly. Connected across the terminals of the armature of the generator 4 by means of the relatively heavy lines in the schematic diagram is a series motor 14 having a field winding 16. The motor 14 is adapted to be connected through suitable clutching devices (not shown) to loads for performing the various operations previously mentioned at the beginning of the specification. The speed and torque of the motor 14 is controlled manually by an operator by varying the energization of the exciter winding 12.

The means for varying the excitation of the exciter 12 is considered to be a basic portion of the control and comprises a variable A.C. voltage transformer 18 (which is manually controlled by the operator) and connected across an A.C. voltage source indicated by the conductors labeled A and C. The output from this transformer is transmitted to an isolating transformer 20 which steps the voltage down. The voltage and current from the secondary winding of the transformer 20 is then rectified by a full-wave rectifier 22 and impressed across a regulating resistor 24 and the exciter generator field 12. Thus the driller by operation of the variable voltage transformer varies the exciter field input and thereby controls the output of the generator 4 and consequently the speed and power of the motor 14. To provide the generator with the desired generator characteristic and stability, a transductor 26 is utilized which allows a feedback of A.C. control current in proportion to the load (generator or motor) current. The transductor 26 is of standard design and is symbolically shown at 26 in the schematic diagram. Since the transductor 26 is conventional no further description is deemed necessary with respect thereto other than to say that the A.C. voltage source supplies control current thereto which is modulated by the heavy current conductor leads forming a part thereof. The transductor so arranged provides a modulating "feedback" current which is rectified by a full-wave rectifier 28 and is applied to the regulating resistance 24 so as to oppose the current applied to the exciter field by the variable voltage transformer 18, transformer 20 and rectifier 22. Thus, as the generator (motor) load current increases, the amount of the transductor feedback increases which in turn opposes the current supplied to the exciter field by transformers 18 and 20 and rectifier 22 and reduces the generator output. This feedback allows a rapid build-up of generator output and a subsequent leveling off after build-up to stabilize the generator output.

Detailed operation and the circuits of the basic control may be traced out and function as follows: Assuming that the driller wishes to supply the motor 14 with power so as to drive a load coupled thereto and perform one or more of the drilling operations previously discussed, he will move by means of a suitable manual control (not shown), a wiper arm 19 forming a part of the variable voltage transformer 18 so that the number of resistive windings thereof between the wiper arm and the primary coil of the isolating step-down transformer 20 is reduced. This will allow more current to alternately flow from one side of the A.C. source through the arm 19 and the primary of the transformer 20. This will induce a greater voltage in the secondary winding of the transformer 20 and cause more current to flow therein and through the rectifier 22 and exciter coil 12. Increasing the excitation of the coil 12 force increases the output voltage of the exciter 6 and the energization of the winding 8 of the generator 4. Increased excitation of winding 8 increases the excitation of the generator 4, and, of course, its voltage to thereby increase the output of generator 4. If, however, the torque demand on the motor 14 is relatively high, then the heavy motor current demand from the generator causes greater feedback by the transductor 26, since the greater current allows a greater feedback of the A.C. control current via the wires labeled A and C and the rectifier 28 across the regulating resistor 24 to thereby level off generator output and stabilize it to obtain a desirable generator operating characteristic.

As previously mentioned, the basic control which has just been described for the generator motor power train including the manner of stabilizing the generator by means of the transductor 26 to obtain certain desirable generator characteristics is considered one of the important features of the invention.

Another feature of the invention worthy of mention includes a special motor generator current limit relay combined with a power lockout so that in the event excessive current occurs in either the motor or the generator circuit, deexcitation of the generator takes place and the generator power output can no longer be increased by the operator until he first moves his power control to the Off position and then readvances the control as in a normal starting sequence. This excessive current relay does not operate for any normal generator current but picks up only in the event of excessive current which might be dangerous to the equipment. The current limit relay is indicated by a symbol CL and comprises a U-shaped frame through which the generator current bus (indicated by heavy lines in the diagram) passes. When the generator current going through the bus reaches the predetermined setting of the relay, sufficient magnetic field strength is set up in the magnetic field to attract the armature 30 of the relay to the frame. When this occurs, the low voltage interlock 32 of the relay will open. When interlock 32 opens, a relay GF will be deenergized causing its interlocks 34 and 36 to open. When interlock 36 opens, exciter field for generator 4 is disconnected from the armature of the exciter 6. Of course, with the exciter field 8 deenergized the generator output rapidly falls and the armature 30 of relay CL returns to normal, closing its interlock 32. The GF relay, however, will not again be energized until the driller returns his power control, i.e., wiper arm 19 to the Off position and then readvances wiper arm 19 in a normal manner. The detailed workings of this current limit relay CL and lockout are as follows: Assuming first that the wiper arm 19 is in the Off position the switching contact 38 connected thereto by a link 40 will be closed. With switching contact 38 closed current may flow from the positive side of the battery BAT through wires 42, 44, switching contact 38, wire 46, the energized winding 48 of a time delay relay 50, and wires 52, 54 returning to the negative side of the battery BAT. Energization of winding 48 of relay 50 causes its interlock 56 to close and its interlock 58 to open. Relay 50, however, is of a special type so that its interlock 56 closes instantly and interlock 58 opens instantly when the relay is energized, but when deenergized interlock 56 delays in opening and interlock 58 instantly recloses. Such relays as 50 are well known in many suitable commercial forms; and, other than the above, no further detailed explanation is deemed necessary with respect thereto.

With this explanation of the operation of relay 50 it will be appreciated that if the operator now moves the wiper arm 19 to the left to open switching contact 38, relay 50, which has been previously energized, becomes deenergized. Because of the time delay opening feature of interlock 56 of relay 50, however, both interlocks 56 and 58 will be momentarily closed at the same time. This will allow current to flow from the positive side of the battery BAT through wires 42 and 44, the closed interlock 58, wire 60, wire 62, the momentarily closed interlock 56 of deenergized relay 50, wires 64 and 66, the energizing coil 68 of relay GF, and wires 70 and 54 returning to the negative side of the battery BAT. Energization of winding 68 of relay GF, of course, causes its interlocks 34 and 36 to close. Closure of interlock 34 of relay GF sets up a holding circuit for this latter relay which includes the positive side of the battery BAT, wires 42 and 44, normally closed interlock 58 of relay 50 when deenergized, wires 60 and 62, the normally closed interlock 72 of a relay SLR, wire 74, normally closed interlock 32 of current limit relay CL, wire 76, now closed interlock 34 of relay GF, wire 66, operating coil 68 of relay GF and wires 70 and 54 returning to the negative side of the battery BAT. The time delay closing feature of the interlock 56 of relay 50 maintains interlock 56 closed long enough upon deenergization of relay 50 to set up the holding circuit for relay GF just traced out. Now if current limit relay CL should be deenergized by excessive flow of current through the generator bus thereby causing the armature 30 of the relay to open the interlock 32, the holding circuit will be broken, as previously explained, causing deenergization of relay GF and deexcitation of the generator 4. Thus, in order to again set up this holding circuit it is first necessary for the operator to move the wiper arm 19 to the Off position so as to close the switch contact 38 which will energize the relay 50 so that it will be placed in a position to, when relay 50 is subsequently deenergized, momentarily maintain both interlocks 56 and 58 closed.

A further feature of the invention is a motor speed limit relay SLR. The purpose of this relay is to act as a motor speed limiting device. There are occasions when the operator, when performing the draw-works operation (at times a relatively light load operation), fails to shift certain gears properly which are in the mechanical portion of the power train between motor 14 and the load. This is because the motor 14 has a relatively large speed range. Such action causes the speed limit relay SLR to pick up because with a light load the motor r.p.m. will naturally be higher. Although this is only one example of a condition under which excessive speed might occur, there are others and the speed limit relay SLR has been developed to give the relay the characteristic of providing definite speed limit regardless of the load on the motor. This relay includes an E-shaped frame having a generator motor bus lead extending between a center and lower leg of the frame as viewed in the drawing. The upper leg of the relay is provided with a coil 78 which is connected across the generator so as to be reflective of generator voltage. This connection includes the heavy bus lead from the upper side of the generator 4 (as viewed in the drawing), a wire 80, a calibrating resistor 82, wire 84, and wire 86 returning to the opposite side of the generator 4. The coil 78 provides the actuating force for the relay while the through-cable opposes the magnetic field of the coil. Thus, when the voltage coil 78 becomes strong enough due to the increased voltage of the generator, it will overcome the ampere turn pull exerted by the motor generator current lead and operate the relay to open its interlock 72. Opening of interlock 72 causes deenergization of the excitation means from the generator 4 in the same manner as the operation of the relay CL. Energization of relay SLR also causes lockout of such deexcitation means, as previously explained in connection with current limit relay CL, so that no further output of the generator 4 can be obtained until the wiper arm 14 is moved to the Off position by the operator. By using both generator voltage and current winding on relay SLR and properly calibrating winding 78, a relay is obtained whose operating characteristic is the same as the safe maximum motor r.p.m. characteristic curve.

As previously mentioned at the beginning of this specification there are drilling conditions where extremely large torques may be required. If, under such conditions, the full power capacity of the equipment is available to the operator and he uses it, thermal or mechanical damage to the electrical and mechanical equipment may result. To prevent such damage, means have been provided which automatically reduce the capacity of the power supplying equipment upon large torque demands.

Reducing power capacity of the equipment to achieve the higher torque requirements without thermal or mechanical damage to the equipment, as just mentioned, takes place automatically and smoothly in an inverse way, i.e., the larger the torque demand the greater the decrease in capacity and the slower the speed of the operation. Turning again to the drawing the means for achieving this desirable result will be described in detail.

The regulating resistance 24 previously mentioned is in reality a part of a special regulator 88 having a pair of operating windings 90 and 92. Winding 90 is reflective of generator (motor) current and is connected in series with the regulating resistance 24 across the rectified control A.C. current modulated by the transductor 26. The circuit including winding 90 beginning with the rectifier 28 includes wires 94, a calibrating resistance 96, tap 97, wire 98, winding 90, wire 100, wire 102, wire 104, regulating resistor 24, calibrating resistor 105 and wire 106.

In parallel with winding 90 across rectifier 28 is a calibrating resistor 108 having a pair of taps whose purpose will appear shortly.

A double pole switch 110 is closed to properly calibrate winding 90 with the calibrating resistor 108 and also to connect the second winding 92 of the regulator 88 across the output terminals of the generator 4. This is accomplished by means of a wire 112 beginning with a heavy current lead from one side of the generator 4, one pole of switch 110, a calibrating resistor 114, wire 116, winding 92 and wires 118 and 86 returning to the opposite side of the generator 4. The windings 90 and 92 are such that they tend to, by suitable linkages 120 and 122, cause their armatures to bias the wiper arm 124 of the regulator 24 in a direction to increase the resistance in the exciter field circuit against the action of a spring 126. In other words, both the coils 90 and 92 act upon increases in energization to increase the resistance in series with the exciter field 12. When decreases in energization of these coils occurs, the spring-loaded finger tends to return to its minimum resistance position. Thus, with switch 110 closed, the regulator 88 is affected by the generator current coil 90 and a generator voltage coil 92 so as to decrease exciter excitation upon increases in generator voltage or generator current, or both. It will be appreciated, of course, that when both generator voltage and generator current increase, the net decrease in exciter excitation will be greater than if only generator current or generator voltage increases. The result of decreasing exciter excitation, of course, is to decrease the generator voltage 4 and thereby reduce the capacity of the generator 4 and the speed of the motor 14. What happens then is that when the loads coupled to motor 14 require large torque, motor 14 slows down and while it may take somewhat longer to accomplish the operation during these heavy torque demands, the equipment is protected against mechanical and thermal damage. There are, however, occasions when the motor is driving, say for example, the draw-works which is a relatively intermittent operation during which thermal limitations are not likely to be exceeded and only mechanical limitations must be met. In this instance switch 110 may be opened. When switch 110 is opened winding 90 is automatically recalibrated by the calibrating resistor 98 and winding 92 is disconnected from across the generator 4 so that only the current winding 90 is effective to vary the resistance 24 of the regulator 88 and thereby vary the excitation 12 of the exciter 6. It will be appreciated that by cutting out winding 92 the excitation 12 for exciter 6 will not be so drastically reduced with high generator voltage and current since only the current will be effective to change this excitation which, however, does have a greater effect because it has been recalibrated. Thus, it will be seen that winding 90 operates to limit the capacity of generator 4 and thereby prevent damage to mechanical portions of the equipment during high torque demands.

From the foregoing description it may now be appreciated that an unusual, extremely versatile control has been provided for a power train. In addition to a control which provides certain desirable operating characteristics for the generators and motors of such power train, the control includes safety features for automatically preventing speed, current, voltage and torque overloads which might otherwise damage parts of the power train. The control is especially adaptable for performing all of the unusual operations required in the drilling of an oil well, such operations including, as previously mentioned, the so-called drill, mud pump, and draw-works operations.

I claim:

1. In combination in an electrical power train, a generator having variable excitation means including a manual portion and an exciting winding and circuit across a voltage source, a motor connected across said generator to receive power therefrom, control means for varying the output of said generator, means responsive to a predetermined magnitude of generator current to open said circuit and completely deenergize said excitation means and thereby prevent excessive generator and motor current and means responsive to movement of the manual portion of said variable excitation means to a minimum excitation position to close said circuit.

2. In combination in an electrical power train, a generator, a separately excited winding for said generator, an exciter having said winding connected thereacross, a separately excited winding for said exciter, a manually variable voltage source having an Off position and in electrical circuit with said exciter winding and operable to control the output of said exciter and said generator, normally closed relay means responsive to a predetermined generator, current to open said circuit and disconnect the separately excited winding of said generator from said exciter, and lockout means associated with said manually variable voltage source responsive to opening of said normally closed relay means to prevent reconnection of said separately excited generator field to said exciter until said manually variable source has been moved to the Off position.

3. In combination with a generator, an exciting winding therefor, manually variable voltage source means having an Off position and adapted to be connected to and control the energization of said winding, a voltage source, switching means connected to and operable by said manually variable means, a relay having a normally closed interlock, and a normally open interlock with a time delay opening characteristic upon deenergization of the winding of said relay, said switching means connecting the operating winding of said relay across said source when said manually variable means is in the Off position, a second relay having an energizing winding and a pair of normally open interlocks one of which when closed connects said winding to said manually variable voltage source means, the interlocks of said first relay being connected in series with each other and with the energizing winding of said second relay across said voltage source, a generator excessive current relay having a normally closed interlock in series with the other interlock of said second relay and the energizing winding of said second relay across said voltage source and responsive upon a predetermined magnitude of generator current to open its normally closed interlock and deenergize said second relay, whereby said winding remains deenergized and said generator cannot be further excited until said manually variable voltage source means is returned to said Off position.

4. In combination with a generator having manually variable excitation means including an exciting winding and circuit across a voltage source, a series motor connected across said generator to receive power therefrom, means to prevent overspeed of said motor when subject to variable loads comprising means responsive to predetermined combinations of voltage and current of said generator to open said circuit and completely deenergize the excitation means for said generator and means responsive to movement of the manual portion of said variable excitation means to a minimum excitation position to close said circuit.

5. In combination with a generator having manually variable excitation means including an exciting winding and circuit across a voltage source, a series motor connected across said generator to receive power therefrom, means to prevent overspeed of said motor subject to variable loads comprising means responsive to both voltage of said generator and current of said motor to open said circuit and completely deenergize the excitation means for said generator and means responsive to movement of the manual portion of said variable excitation means to a minimum excitation position to close said circuit.

6. In combination with a generator having manually variable excitation means, a series motor connected across said generator to receive power therefrom, means to prevent overspeed of said motor subject to variable loads comprising a relay having a voltage coil connected across the output terminals of said generator, and a current coil carrying the armature current of said generator, said coils being arranged so that said current coil normally dominates said voltage coil, an armature for said relay including a normally closed interlock in circuit with the excitation means for said generator, whereby sufficient decreases in load of said motor or sufficient increases in the generator voltage which would cause excessive speed of said motor cause said voltage coil to dominate said current coil to open said interlock and completely deenergize the excitation means for said generator and means responsive to movement of the manual portion of said manually variable excitation means to a minimum excitation position to reenergize the excitation means for said generator.

7. In combination with a generator having manually variable excitation means, a series motor connected across said generator to receive power therefrom, and means to prevent overspeed of said motor subject to variable loads comprising a walking relay having an E-shaped yoke, a current carrying lead between said motor and said generator acting as a current winding for one of the outer legs of said yoke, a voltage coil on the other outer leg of said yoke connected across the output terminals of said generator, the center leg of said yoke having pivotally connected thereto an armature normally dominated by the leg having said motor current carrying coil and including a normally closed interlock in circuit with the excitation means for said generator whereby decreases in the load of said motor or increases in the voltage of said generator sufficient to increase the speeds of said motor beyond its normal speed ranges causes said relay to open its interlock and completely deenergize the excitation means for said generator, and means responsive to opening of said interlock to lock out the excitation means for said generator until said variable excitation means is moved to the minimum excitation position.

References Cited in the file of this patent
UNITED STATES PATENTS

| | | |
|---|---|---|
| 1,347,908 | Pasquier et al. | July 27, 1920 |
| 1,396,853 | Lammers | Nov. 15, 1921 |
| 1,658,704 | Camhy | Feb. 7, 1928 |
| 1,732,744 | Edson | Oct. 22, 1929 |
| 1,899,550 | Beekman | Feb. 28, 1933 |
| 1,930,513 | Eames | Oct. 17, 1933 |
| 2,429,716 | Godsey | Oct. 28, 1947 |
| 2,494,365 | Sills | Jan. 10, 1950 |
| 2,709,774 | Wells | May 31, 1955 |
| 2,719,259 | Miner | Sept. 27, 1955 |
| 2,722,642 | Hunt | Nov. 1, 1955 |
| 2,735,054 | Schaelchlin | Feb. 14, 1956 |